United States Patent
Gejji et al.

(10) Patent No.: US 9,812,146 B1
(45) Date of Patent: Nov. 7, 2017

(54) SYNCHRONIZATION OF INBOUND AND OUTBOUND AUDIO IN A HETEROGENEOUS ECHO CANCELLATION SYSTEM

(71) Applicant: Amazon Technologies, Inc., Seattle, WA (US)

(72) Inventors: Pushkaraksha Gejji, Cupertino, CA (US); Arvind Mandhani, San Francisco, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/044,495

(22) Filed: Feb. 16, 2016

(51) Int. Cl.
  *H04B 3/20* (2006.01)
  *G10L 21/02* (2013.01)
  *G10L 21/0208* (2013.01)
  *G10L 15/22* (2006.01)
  *G10L 21/0216* (2013.01)
  *H04B 3/23* (2006.01)
  *H04M 9/08* (2006.01)

(52) U.S. Cl.
  CPC .... *G10L 21/0205* (2013.01); *G10L 2015/223* (2013.01); *G10L 2021/02082* (2013.01); *G10L 2021/02163* (2013.01); *H04B 3/23* (2013.01); *H04M 9/082* (2013.01)

(58) Field of Classification Search
  CPC ................................ H04M 9/082; H04B 3/23
  USPC ........................ 381/83, 93; 379/406.1–406.9, 379/406.12–406.14
  See application file for complete search history.

(56) References Cited

U.S. PATENT DOCUMENTS

| | | | | |
|---|---|---|---|---|
| 7,555,116 B1* | 6/2009 | Le Tourneur | ......... | H04M 9/082 379/406.03 |
| 2007/0121925 A1* | 5/2007 | Cruz-Zeno | ............ | H04M 9/082 379/406.01 |
| 2012/0219146 A1* | 8/2012 | Mason | .................. | H04M 9/082 379/406.01 |
| 2014/0177856 A1* | 6/2014 | Sudo | ...................... | H04R 3/002 381/66 |

\* cited by examiner

Primary Examiner — Disler Paul
(74) Attorney, Agent, or Firm — Pierce Atwood LLP

(57) ABSTRACT

An echo cancellation system that synchronizes output audio data with input audio data in a heterogeneous system. The system may increment a counter as outgoing audio frames are sent to a digital-to-analog converter in a speaker. As incoming audio frames are received by an analog-to-digital converter in a microphone, the system may copy contents of the counter into the incoming audio frames. Based on the contents of the counter, the incoming audio frames may be associated with corresponding outgoing audio frames. After synchronizing the incoming audio frames and the outgoing audio frames, the system may perform Acoustic Echo Cancellation by removing the outgoing audio frames from the incoming audio frames.

18 Claims, 9 Drawing Sheets

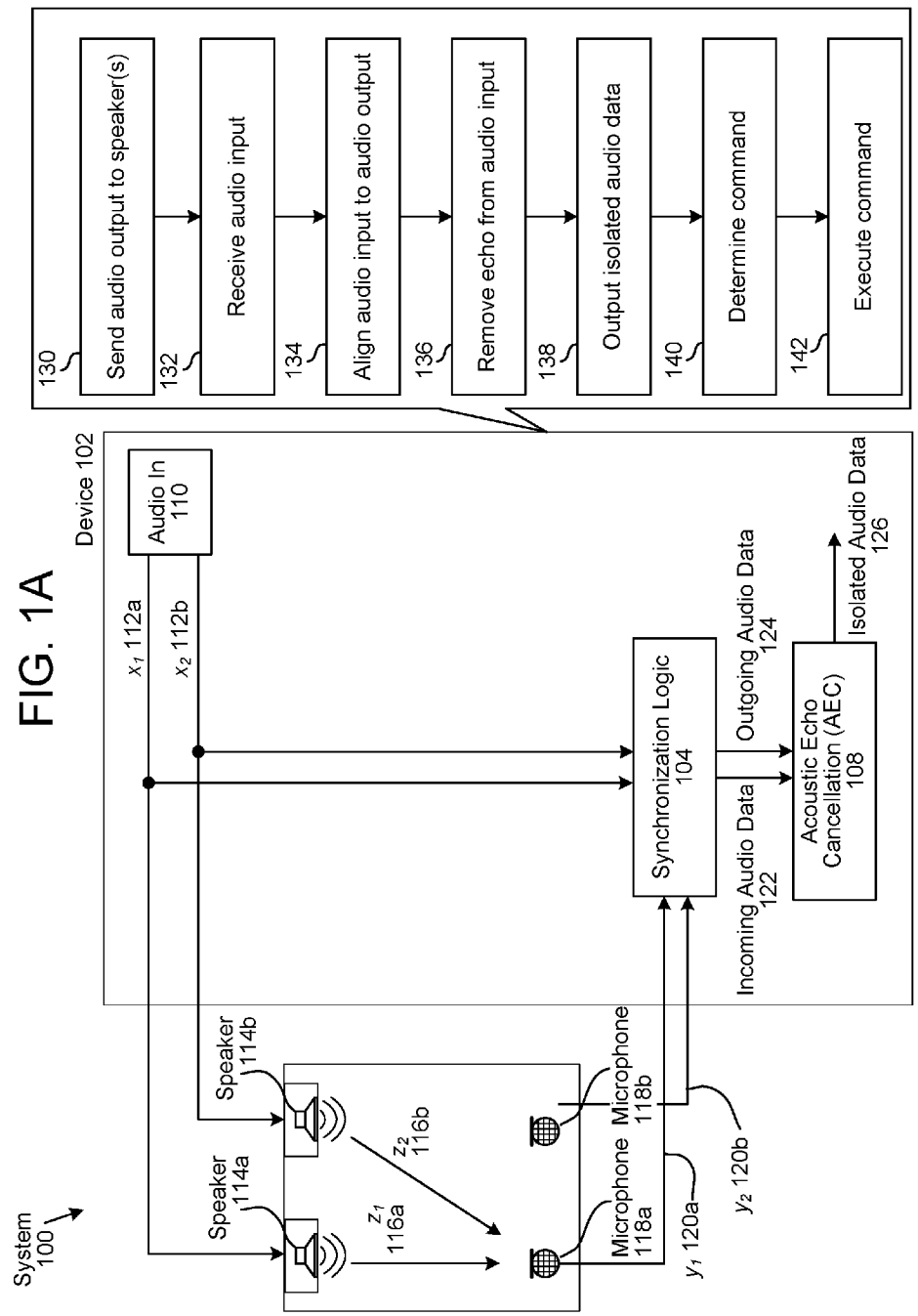

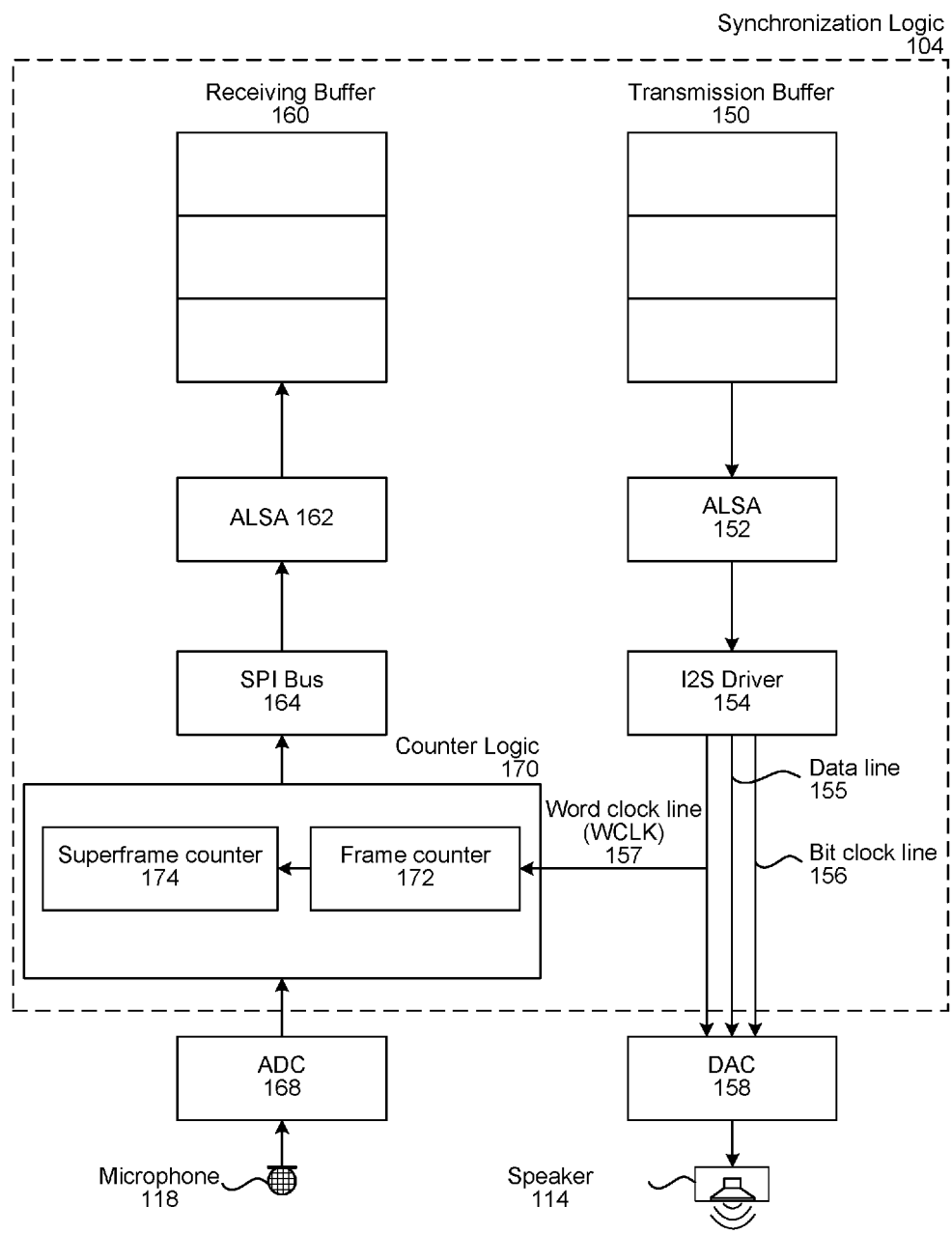

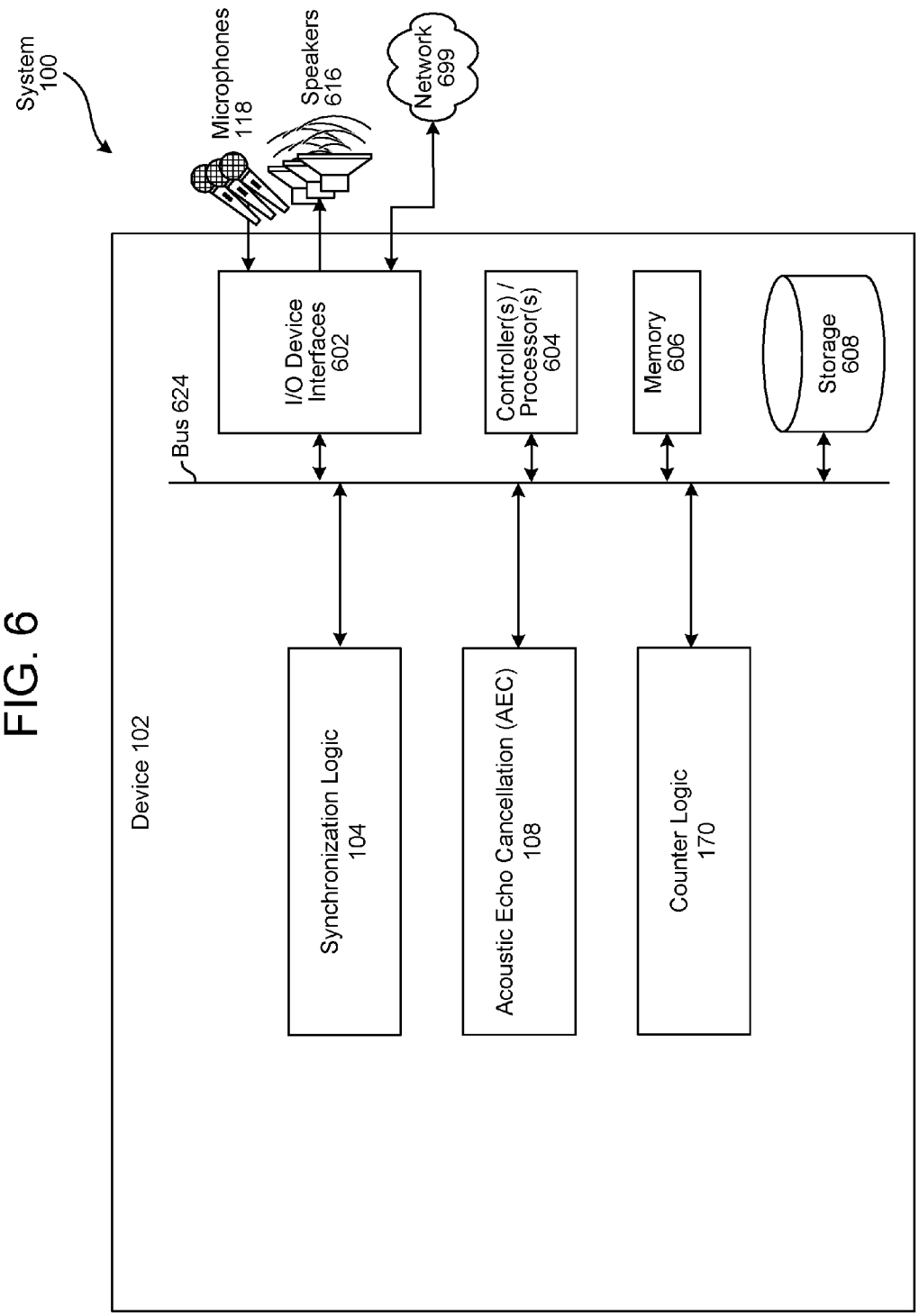

SYNCHRONIZATION OF INBOUND AND OUTBOUND AUDIO IN A HETEROGENEOUS ECHO CANCELLATION SYSTEM

BACKGROUND

In audio systems, automatic echo cancellation (AEC) refers to techniques that are used to recognize when a system has recaptured sound via a microphone after some delay that the system previously output via a speaker. Systems that provide AEC subtract a delayed version of the original audio signal from the captured audio, producing a version of the captured audio that ideally eliminates the "echo" of the original audio signal, leaving only new audio information. For example, if someone were singing karaoke into a microphone while prerecorded music is output by a loudspeaker, AEC can be used to remove any of the recorded music from the audio captured by the microphone, allowing the singer's voice to be amplified and output without also reproducing a delayed "echo" the original music. As another example, a media player that accepts voice commands via a microphone can use AEC to remove reproduced sounds corresponding to output media that are captured by the microphone, making it easier to process input voice commands.

BRIEF DESCRIPTION OF DRAWINGS

For a more complete understanding of the present disclosure, reference is now made to the following description taken in conjunction with the accompanying drawings.

FIGS. 1A-1B illustrate echo cancellation systems according to embodiments of the present disclosure.

FIG. 6 is a block diagram conceptually illustrating example components of a system for echo cancellation according to embodiments of the present disclosure.

DETAILED DESCRIPTION

Figure 2A:
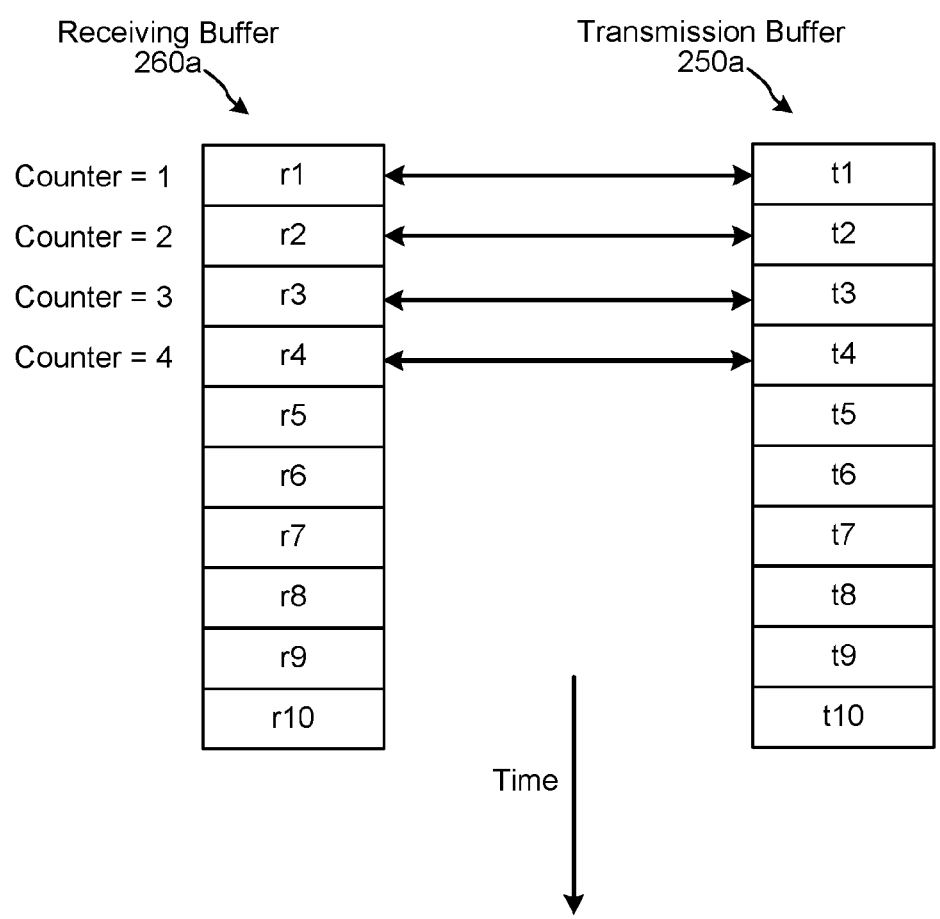
FIGS. 2A-2B illustrate examples of synchronized buffers according to embodiments of the present disclosure.

Typically, a conventional Acoustic Echo Cancellation (AEC) system may remove audio output by a loudspeaker from audio captured by the system's microphone(s) by subtracting a delayed version of the originally transmitted audio. In a heterogeneous audio system where outbound audio packets (e.g., audio data sent to a loudspeaker) are controlled by different hardware (e.g., separate integrated circuits and/or devices) than inbound audio packets (e.g., audio data received by a microphone), problems with the typical AEC approach may occur when the inbound audio packets are not synchronized with the outbound audio packets. For example, when the AEC system attempts to remove the audio output by the loudspeaker from audio captured by the system's microphone(s) by subtracting a delayed version of the originally transmitted audio, the audio captured by the microphone may be subtly different than the audio that had been sent to the loudspeaker.

Differences between the audio captured by the microphone and the audio output by the loudspeaker may be a result of variable delays inherent in the system. A first cause of variable delay is that the outbound audio packets sent to the loudspeaker may be modified based on compression/decompression during communication, which isn't performed at a fixed rate or associated with a fixed delay. A second cause is non-linear post-processing performed on the outbound audio packets by the loudspeaker prior to generating audio. A third cause is buffering performed by the loudspeaker, which could create unknown latency, additional samples, fewer samples or the like. As a result, even if the outbound audio packets are synchronized with the inbound audio packets in software on the device, the variable delays cannot be accounted for and affect the AEC processing.

However, converting digital audio signals into analog audio signals ("D/A conversion") and converting analog audio signals into digital audio signals ("A/D conversion") are associated with fixed delays that are predictable. Such conversions are commonplace in audio systems, such as when the loudspeaker performs D/A conversion on the outbound audio packets to recreate an analog signal and when the microphone performs A/D conversion from the audio captured by the microphone to generate the inbound audio packets. Therefore, synchronizing outbound audio packets as they are received by a digital-to-analog converter with inbound audio packets as they are generated by an analog-to-digital converter accounts for variable delays present in the system.

To improve a synchronization of outgoing audio data with incoming audio data, devices, systems and methods may synchronize the outgoing audio data (as the outgoing audio data is sent to a digital-to-analog converter (DAC) in a loudspeaker) with incoming audio data (as the incoming audio data is sent from an analog-to-digital converter (ADC) in a microphone). For example, the system may maintain a counter that increments as each outgoing audio frame is sent to the speaker and may use the counter to synchronize incoming audio frames to the outgoing audio frames. As the incoming audio frames (when sent by the ADC) are associated with the outgoing audio frames (when sent to the DAC), the incoming audio frames and the outgoing audio frames may be synchronized using fixed delays, avoiding variable delays caused by layers of software. Therefore, incoming audio frames may be time aligned with the outgoing audio frames.

FIG. 1A illustrates a high-level conceptual block diagram of echo-cancellation aspects of an AEC system 100 using conventional AEC. As illustrated, an audio input 110 provides stereo audio "reference" signals $x_1(n)$ 112a and $x_2(n)$ 112b. The reference signal $x_1(n)$ 112a is transmitted to a loudspeaker 114a, and the reference signal $x_2(n)$ 112b is transmitted to a loudspeaker 114b. Each speaker outputs the received audio, and portions of the output sounds are captured by a pair of microphones 118a and 118b as "echo" signals $y_1(n)$ 120a and $y_2(n)$ 120b, which contain some of the reproduced sounds from the reference signals $x_1(n)$ 112a and $x_2(n)$ 112b, in addition to any additional sounds (e.g., speech) picked up by the microphones 118.

To isolate the additional sounds from the reproduced sounds, the device 102 may include synchronization logic 104 that may synchronize the echo signals 120 and the reference signals 112 to generate incoming audio data 122 and outgoing audio data 124 that is time-aligned. To generate the incoming audio data 122 and the outgoing audio data 124, the synchronization logic 104 may receive the reference signals 112 (e.g., audio transmitted by the loudspeakers 114) and the echo signals 120 (e.g., audio received by the microphones 118) and may generate the outgoing audio data 124 by delaying and/or processing the reference signals 112 based on the echo signals 120. For example, the outgoing audio data 124 may compensate for a propagation delay between the reference signals 112 and the echo signals 120 such that a beginning of the outgoing audio data 124 corresponds to a beginning of the incoming audio data 122.

Additionally or alternatively, the synchronization logic 104 may compensate for distortion, variable delay, drift, skew and/or frequency offset between the reference signals 112 and the echo signals 120. In some examples, the synchronization logic 104 may determine a frequency offset between the modified reference signals 112 and the echo signals 120 and may add/drop samples of the modified reference signals and/or the echo signals 120 to compensate for the frequency offset. For example, the synchronization logic 104 may add at least one sample per cycle when the frequency offset is positive and may remove at least one sample per cycle when the frequency offset is negative. Therefore, the incoming audio data 122 may be aligned with the outgoing audio data 124.

The Acoustic Echo Cancellation (AEC) 108 may remove the outgoing audio data 124 (e.g., reproduced sounds) from the incoming audio data 122 (e.g., reproduced sounds and additional sounds) to remove the reproduced sounds and isolate the additional sounds (e.g., speech) as isolated audio data 126. To illustrate, the device 102 may use the incoming audio data 122 as a target signal, which may be shown in equation (1):

$$\text{Target} = s + z + \text{noise} \quad (1)$$

where s is speech (e.g., the additional sounds), z is an echo from the reference signals 112 sent to the loudspeaker (e.g., the reproduced sounds) and noise is additional noise that is not associated with the speech or the echo. In order to attenuate the echo (z), the device 102 may use the outgoing audio data 124 as a reference signal, which may be shown in equation 2:

$$\text{Reference} = z + \text{noise} \quad (2)$$

By removing the reference signal (e.g., outgoing audio data 124) from the target signal (e.g., incoming audio data 122), the device 102 may remove the echo and generate the isolated audio data 126 including only the speech and some noise. The device 102 may use the isolated audio data 126 to perform speech recognition processing on the speech to determine a command and may execute the command. For example, the device 102 may determine that the speech corresponds to a command to play music and the device 102 may play music in response to receiving the speech.

The device 102 may use a variety of techniques to perform AEC. As a first example, the device 102 may remove a normal reference signal from input audio received by the microphone 118. As a second example, the device 102 may remove a normal reference signal from a portion of the input audio, such as by beamforming the input audio and selecting a first portion of the input audio corresponding to a first direction. As a third example, the device 102 may remove an adaptive reference signal from the input audio, such as by beamforming the input audio and selecting a first portion of the input audio corresponding to a first direction as the adaptive reference signal. As a fourth example, the device 102 may remove an adaptive reference signal from a portion of the input audio. However, the present disclosure is not limited thereto and the device 102 may perform AEC using any techniques known to one of skill in the art.

As illustrated in FIG. 1A, the device 102 may send (130) audio output to speaker(s) and may receive (132) audio input from microphone(s). The device 102 may align (134) the audio input to the audio output, may remove (136) an echo from the audio input by removing the audio output from the audio input and may output (138) isolated audio data including the speech or additional sounds. The device 102 may determine (140) a command using the isolated audio data and may execute (142) the command. For example, the device 102 may remove music (e.g., reproduced sounds) played over the loudspeakers 114 to isolate a voice command input to the microphones 118 and may execute the voice command, such as by changing a song, opening an application, controlling a volume or the like.

FIG. 1B illustrates an example of synchronization logic 104 synchronizing incoming audio data 122 with outgoing audio data 124. The device 102 is an example of a heterogeneous audio system where outbound audio packets (e.g., audio data sent to a loudspeaker) are controlled by different hardware (e.g., separate integrated circuits and/or devices) than inbound audio packets (e.g., audio data received by a microphone). For example, the outbound audio stream extending from a transmission buffer 150 to the speaker 114 may be controlled by a first integrated circuit having a first clock and the inbound audio stream extending from the microphone 118 to a receiving buffer 160 may be controlled by a second integrated circuit having a second clock. As another example, a digital-to-analog converter (DAC) 158 may be a first integrated circuit having a first clock, an analog-to-digital converter (ADC) 168 may be a second integrated circuit having a second clock, and counter logic 170 may be a third integrated circuit having a third clock. Therefore, the synchronization logic 104 may use the counter logic 170 in order to compensate for differences between the unsynchronized clocks.

As illustrated in FIG. 1B, the synchronization logic 104 may store output audio data in a transmission buffer 150 and may include first Advanced Linux Sound Architecture (ALSA) 152 and an Integrated Interchip Sound (I2S) Driver 154 that sends output audio data to a digital-to-analog converter (DAC) 158 associated with a speaker 114 for audio playback. The DAC 158 converts the output audio data from a digital signal to an analog signal and the loudspeaker 114 produces audible sound by driving a "voice coil" with an amplified version of the analog signal. As used herein, an audio frame (e.g., sample) is a portion of audio data and contains amplitude (e.g., loudness) information at a particular point in time. For example, the output audio data may include a series of outgoing audio frames and the speaker may produce sound by playing the series of outgoing audio frames in sequence to produce frequencies. Similarly, the microphone 118 may generate the input audio data based on frequencies received by the microphone 118 and the input audio data may include a series of incoming audio frames.

A microphone 118 may receive speech and the audible sound and an analog-to-digital converter (ADC) 168 may convert the received signal from an analog signal to a digital signal and may send the digital signal to counter logic 170 as input audio data. The counter logic 170 may maintain a frame counter 172 (e.g., store a natural number) based off of the output audio data and may associate the input audio data with the output audio data using the frame counter 172. The frame counter 172 may store data (e.g., a counter value) and may increment, decrement or replace the data with a new counter value as instructed by the counter logic 170. For example, when the frame counter 172 is initialized, the frame counter 172 may store a first counter value (e.g., 0). As a first outgoing audio frame is sent to the DAC 158, the frame counter 172 may increment the first counter value to a second counter value (e.g., 1), and as a second outgoing audio frame is sent to the DAC 158, the frame counter 172 may increment the second counter value to a third counter value (e.g., 3).

The counter logic 170 may include a superframe counter 174 that groups the input audio data into superframes, which are collections of a fixed number of audio frames, and maintains a list of how many audio frames are output from the counter logic 170. For example, a superframe may be a collection of 128 audio frames and the counter logic 170 may include a buffer that stores a portion of a previous superframe (N−1), an entirety of a current superframe (N) and a portion of a subsequent superframe (N+1). The counter logic 170 may output the input audio data (e.g., individual audio frames) to a Serial Peripheral Interface (SPI) bus 164 that sends the input audio data to a second ALSA 162 and the synchronization logic 104 may store the input audio data in a receiving buffer 160.

To illustrate an example, the synchronization logic 104 may receive the reference signals 112 and may store the reference signals 112 in the transmission buffer 150 as the output audio data. Thus, the output audio data sent to the speaker 114 may correspond to the reference signals 112. Similarly, the synchronization logic 104 may receive the echo signals 120 from the microphone 118 and may store the echo signals 120 in the receiving buffer 160 as the input audio data. Thus, the input audio data received from the microphone 118 may correspond to the echo signals 120. However, the synchronization logic 104 synchronizes contents of the transmission buffer 150 and contents of the receiving buffer 160 to generate the incoming audio data 122 and the outgoing audio data 124. Thus, the incoming audio data 122 corresponds to the echo signals 120 and the outgoing audio data 124 corresponds to the reference signals 112, but the incoming audio data 122 is synchronized (e.g., time aligned) with the outgoing audio data 122. For example, the synchronization logic 104 may generate the outgoing audio data 122 by time-shifting (e.g., delaying) the reference signals 112 to compensate for the propagation delay.

To synchronize the incoming audio data 122 with the outgoing audio data 124, the synchronization logic 104 may monitor the output audio data sent from the I2S driver 154 to the DAC 158 and may increment the frame counter 172 after each audio frame. For example, the I2S driver 154 may send the output audio data to the DAC 158 using at least one data line 155, a bit clock line 156 and a word clock line (WCLK) 157. The bit clock line 156 may pulse once for each discrete bit of data on the data lines, and a bit clock frequency is a product of the sample rate, the number of bits per channel and the number of channels. For example, output audio data with a sample frequency of 44.1 kHz, with 16 bits of precision and two channels (e.g., stereo) has a bit clock frequency of 1.4112 MHz. The word clock line (WCLK) 157 indicates whether a first audio channel (e.g., Left channel) or a second audio channel (e.g., Right channel) is being transmitted, as I2S allows two channels to be sent on a single data line. Therefore, by monitoring the WLCK 157, the synchronization logic 104 may determine when each audio frame is sent. For example, the synchronization logic 104 may increment the frame counter 172 whenever the WCLK 157 toggles (e.g., switches from low to high or from high to low).

The synchronization logic 104 may be initialized prior to the output audio data being sent to the speaker 114. For example, the frame counter 172 may be set to a value of zero and the transmission buffer 150 and the receiving buffer 160 may be initialized so that a first entry in the transmission buffer 150 corresponds to a first entry in the receiving buffer 160. As each audio frame of the output audio data is sent to the DAC 158, the frame counter 172 may increment. As each audio frame of the input audio data is received by the ADC 168, the synchronization logic 104 may copy contents of the frame counter 172 to the audio frame.

As an illustration, the transmission buffer 150 may store a first outgoing audio frame as a first entry and may send the first outgoing audio frame to the DAC 158. After determining that the WLCK 157 toggled (e.g., transitioned from a low signal to a high signal), the counter logic 170 may increment the frame counter 172 from the initial value of zero to a value of one. The ADC 168 may receive a first incoming audio frame from the microphone 118 and the counter logic 170 may store the contents of the frame counter 172 (e.g., a value of one) in the first incoming audio frame or associate the contents of the frame counter 172 with the first incoming audio frame. The first incoming audio frame may be sent to the receiving buffer 160 and, based on the value of one stored in the first incoming audio frame, the receiving buffer 160 may store the first incoming audio frame as a first entry in the receiving buffer 160. Thus, the first entry of the receiving buffer 160 corresponds to the first entry of the transmission buffer 150 as contents of the first entry of the receiving buffer 160 (e.g., first incoming audio frame) were received by the microphone 118 substantially simultaneously to when contents of the first entry of the transmission buffer 150 (e.g., first outgoing audio frame) were output by the speaker 114 as audible sound.

As a first example, a first sample rate of the speaker 114 may be identical to a second sample rate of the microphone 118, such that each subsequent entry in the transmission buffer 150 corresponds to each subsequent entry in the receiving buffer 160. For example, the transmission buffer 150 may store a second outgoing audio frame as a second entry and may send the second outgoing audio frame to the DAC 158. After determining that the WLCK 157 toggled (e.g., transitioned from a low signal to a high signal), the counter logic 170 may increment the frame counter 172 from the previous value of one to a value of two. The ADC 168 may receive a second incoming audio frame from the microphone 118 and the counter logic 170 may store the contents of the frame counter 172 (e.g., a value of two) in the second incoming audio frame or associate the contents of the frame counter 172 with the second incoming audio frame. The second incoming audio frame may be sent to the receiving buffer 160, the receiving buffer 160 may store the second incoming audio frame as a second entry in the receiving buffer 160 and, based on the value of two stored in or associated with the second incoming audio frame, the second entry of the receiving buffer 160 may be associated with the second entry of the transmission buffer 150.

FIG. 2A illustrates the first example. As illustrated in FIG. 2A, a second entry r2 of the receiving buffer 260a corresponds to a second entry t2 of the transmission buffer 260a as contents of the second entry r2 of the receiving buffer 260a (e.g., second incoming audio frame) were received by the microphone 118 substantially simultaneously to when contents of the second entry t2 of the transmission buffer 250a (e.g., second outgoing audio frame) were output by the speaker 114 as audible sound. As illustrated in FIG. 2A, the second entry r2 of the receiving buffer 260a may be associated with the first entry t2 of the transmission buffer 250a due to the counter storing a value of "2" when the second incoming audio frame was received. While FIG. 2A illustrates the counter values, the disclosure is not limited thereto and as part of storing the incoming audio frames in the receiving buffer 260a, the receiving buffer 260a may discard the counter values added by the counter logic 170.

As a second example, a first sample rate (e.g., 48 kHz) of the speaker 114 may be different than a second sample rate (e.g., 16 kHz) of the microphone 118, such that there are multiple entries in the transmission buffer 150 for a single entry in the receiving buffer 160. For example, the transmission buffer 150 may store a second outgoing audio frame as a second entry t2, a third outgoing audio frame as a third entry t3 and a fourth outgoing audio frame as a fourth entry t4, and may send the second outgoing audio frame, the third outgoing audio frame and the fourth outgoing audio frame to the DAC 158. After determining that the WLCK 157 toggled for the second outgoing audio frame, the counter logic 170 may increment the frame counter 172 from the previous value of one to a value of two. After determining that the WLCK 157 toggled for the third outgoing audio frame, the counter logic 170 may increment the frame counter 172 from the previous value of two to a value of three. After determining that the WLCK 157 toggled for the fourth outgoing audio frame, the counter logic 170 may increment the frame counter 172 from the previous value of three to a value of four.

At this point, the ADC 168 may receive a second incoming audio frame from the microphone 118 and the counter logic 170 may store the contents of the frame counter 172 (e.g., a value of four) in the second incoming audio frame or associate the contents of the frame counter 172 with the second incoming audio frame. The second incoming audio frame may be sent to the receiving buffer 160, the receiving buffer 160 may store the second incoming audio frame as a second entry r2 in the receiving buffer 160 and, based on the value of four stored in or associated with the second incoming audio frame, the synchronization logic 104 may associate the second entry r2 in the receiving buffer 160 with the fourth entry t4 in the transmission buffer 150.

Figure 2B:
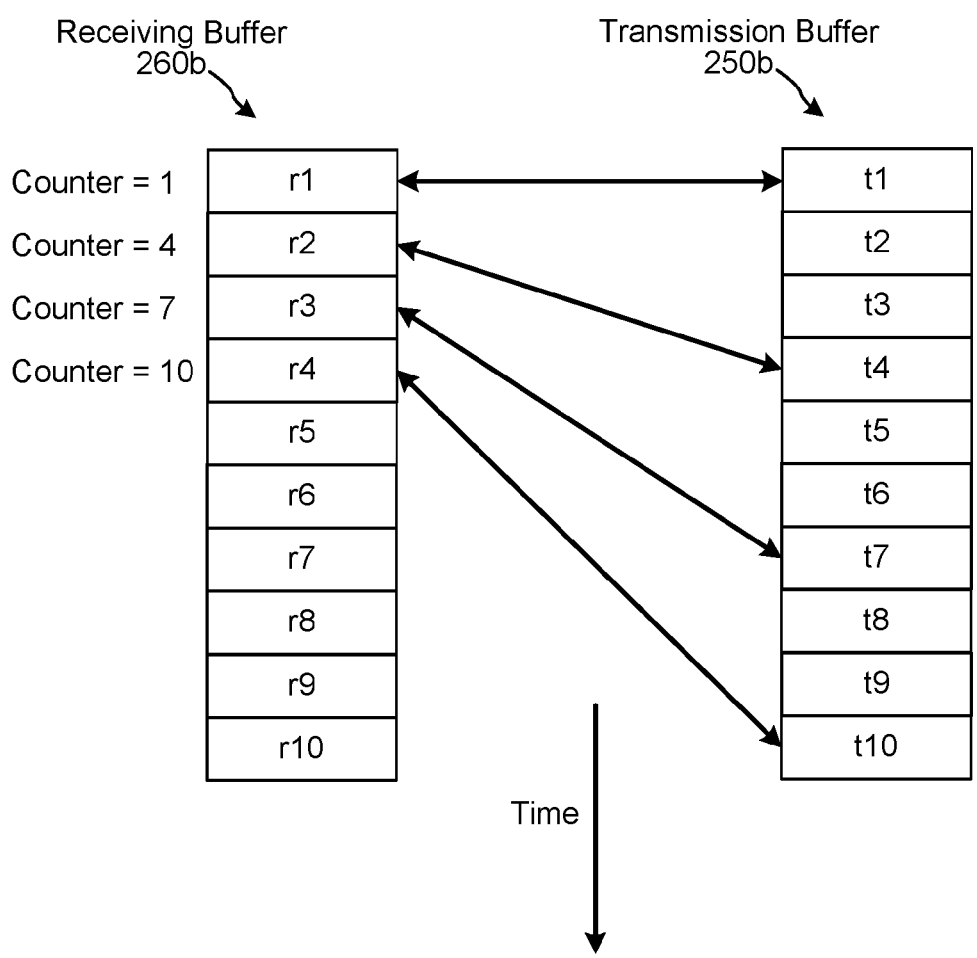

FIG. 2B illustrates the second example. As illustrated in FIG. 2B, a second entry r2 of the receiving buffer 260b corresponds to the fourth entry t4 of the transmission buffer 250b as contents of the second entry r2 of the receiving buffer 260b (e.g., second incoming audio frame) were received by the microphone 118 substantially simultaneously to when contents of the fourth entry t4 of the transmission buffer 250b (e.g., fourth outgoing audio frame) were output by the speaker 114 as audible sound. Therefore, due to the 3:1 ratio of the first sample rate to the second sample rate, a series of incoming audio frames may be associated with a sequence of frame counter values (e.g., 1, 4, 7, etc.) and corresponding entries in the transmission buffer 250b.

While FIG. 2B illustrates the counter value of "4" associated with the second entry r2 of the receiving buffer 260b, the disclosure is not limited thereto and as part of storing the incoming audio frames in the receiving buffer 260b, the receiving buffer 260b may discard the counter values added by the counter logic 170. While the incoming audio frames stored in the receiving buffer 260b no longer include the counter values explicitly associating the incoming audio frames to the outgoing audio frames, the device 102 may associate the incoming audio frames stored in the receiving buffer 260b to the outgoing audio frames stored in the transmission buffer 250b based on the sequence that the incoming audio frames/outgoing audio frames are stored. For example, the device 102 may determine a sampling ratio comparing a first sampling rate of the speaker 114 to a second sampling rate of the microphone 118 and therefore associate the outgoing audio frames with the incoming audio frames based on the sampling ratio. To illustrate, due to the 3:1 sampling ratio illustrated in FIG. 2B, the device 102 may associate the first entry r1 in the receiving buffer 260b with entries t1-t3 of the transmission buffer 250b, the second entry r2 in the receiving buffer 260b with entries t4-t6 of the transmission buffer 250b, and so on. In some examples, the device 102 may associate the first entry r1 in the receiving buffer 260b with the first entry t1 in the transmission buffer 250b and discard the second entry t2 and the third entry t3 in the transmission buffer 250b. However, the disclosure is not limited thereto and the device 102 may instead calculate a mean or other mathematical function of the entries t1-t3 in the transmission buffer 250b.

To perform AEC, the synchronization logic 104 may use the entries stored in the receiving buffer 160 to generate the incoming audio data 122 and the entries stored in the transmission buffer 150 to generate the outgoing audio data 124. For example, the synchronization logic 104 may compensate for a propagation delay between the speaker 114 and the microphone 118 so that first audio data associated with a first time in the incoming audio data 122 corresponds to second audio data associated with the first time in the outgoing audio data 124. Thus, the synchronization logic 104 may determine the propagation delay and may compensate for the propagation delay.

After generating and synchronizing the incoming audio data 122 and the outgoing audio data 124, the device 102 may perform AEC to generate the isolated audio data 126. For example, the AEC 108 may receive the incoming audio data 122 and the outgoing audio data 124 and may remove the outgoing audio data 124 from the incoming audio data 122 to generate the isolated audio data including the speech or additional sounds.

Using techniques discussed above with regard to FIGS. 1A-2B, the device 102 may synchronize incoming audio data 122 with outgoing audio data 124 based on when the incoming audio data 122 is actually received by the microphone 118 and the outgoing audio data 124 is actually output by the speaker 114. As there is a fixed, deterministic delay (e.g., 5 ms) caused by the DAC 158 and the ADC 168, the device 102 may synchronize the incoming audio data 122 with the outgoing audio data 124 with a nonvariable time difference (e.g., 5 ms) that is below a threshold. In contrast, if the device 102 synchronized the echo signals 120 with the reference signals 112 using higher level software (e.g., further away from the DAC 158/ADC 168, such as in the transmission buffer 150 and the receiving buffer 160), there would be a variable, non-deterministic delay (e.g., 5 ms to 10 ms) through multiple software layers as the audio packets are sent to the speaker 114 and/or received by the microphone 118. Thus, the echo signals 120 would be synchronized to the reference signals 112 with a time difference that is above the threshold and/or a variable time difference (e.g., 5 ms to 10 ms), resulting in distortion in the isolated audio data 126.

Figure 3:
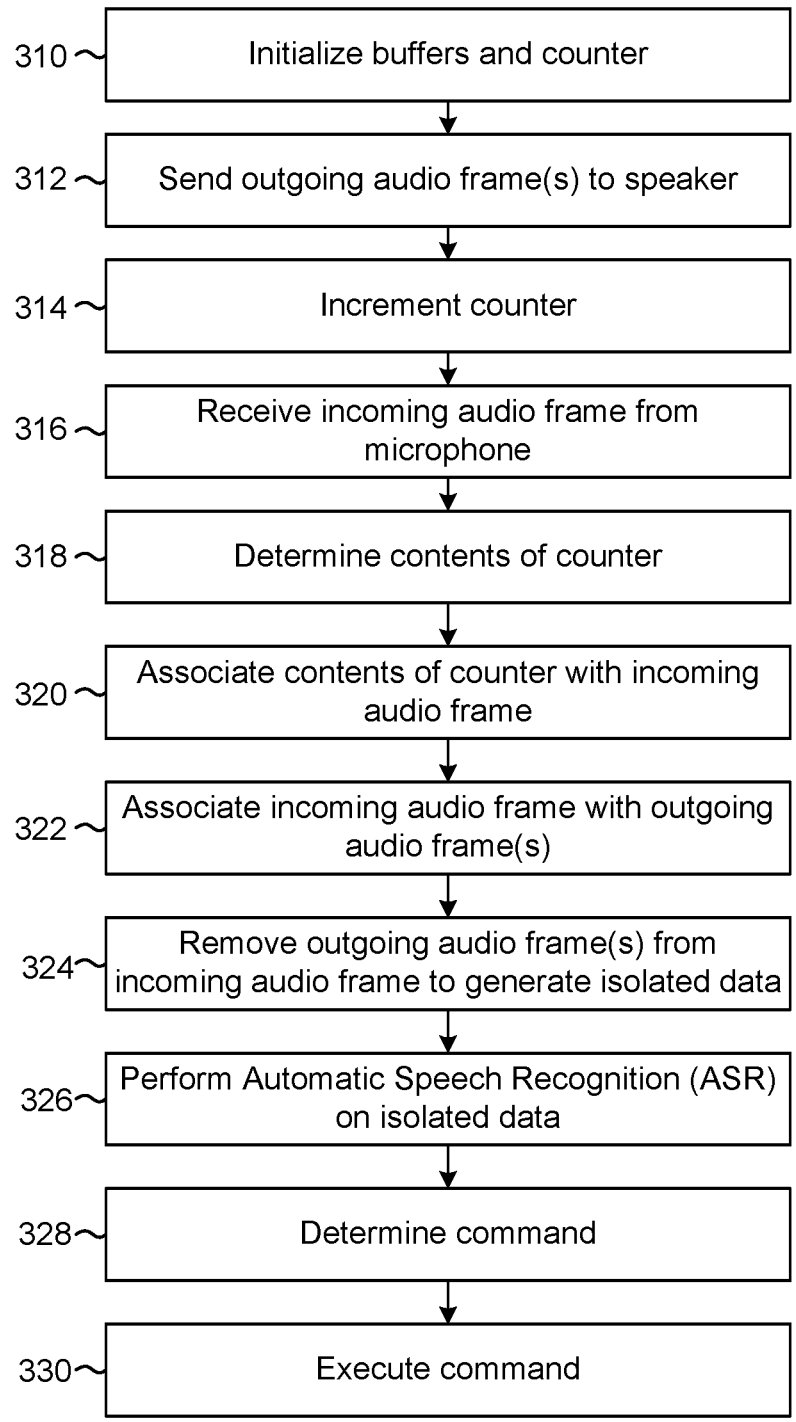
FIG. 3 is a flowchart conceptually illustrating an example method for synchronizing buffers according to embodiments of the present disclosure.

FIG. 3 is a flowchart conceptually illustrating an example method for synchronizing buffers according to embodiments of the present disclosure. As illustrated in FIG. 3, the device 102 may initialize (310) buffers (e.g., reset transmission buffer and receiving buffer) and a counter (e.g., set contents of frame counter to a value of zero). The device 102 may send (312) outgoing audio frame(s) to the speaker and increment (314) the counter after each outgoing audio frame. For example, when a sampling ratio (e.g., ratio between a first sampling rate of the speaker 114 to a second sampling rate of the microphone 118) is equal to 3:1, the device 102 may send three outgoing audio frames and increment the counter three times for each incoming audio frame. The device 102 may receive (316) an incoming audio frame from the microphone, may determine (318) contents of the counter, may associate (320) the contents of the counter with the incoming audio frame and may associate (322) the incoming audio frame with the outgoing audio frame(s). For example, the device 102 may increment the counter each time an outgoing frame is sent to the speaker and may copy the contents (e.g., output) of the counter to incoming audio frames as they are received by the microphone. In some examples, the device 102 may embed the contents of the counter to a header of the incoming audio frames.

When the incoming audio frames are sent to the receiving buffer, the receiving buffer may store the incoming audio frames based on the contents of the counter stored in the incoming audio frames and may then discard the contents of the counter from the incoming audio frames. While the incoming audio frames stored in the receiving buffer no longer include the counter values explicitly associating the incoming audio frames to the outgoing audio frames in the transmission buffer, the device 102 may associate the incoming audio frames and the outgoing audio frames based on the sequence that the incoming audio frames/outgoing audio frames are stored. For example, the device 102 may determine a sampling ratio comparing a first sampling rate of the speaker 114 to a second sampling rate of the microphone 118 and therefore associate the outgoing audio frames with the incoming audio frames based on the sampling ratio. In some examples, the device 102 may associate a first entry in the receiving buffer with a first entry in the transmission buffer and discard a second entry and a third entry in the transmission buffer. However, the disclosure is not limited thereto and the device 102 may instead calculate a mean or other mathematical function of the first, second and third entries in the transmission buffer.

The device 102 may remove (324) the outgoing audio frame from the incoming audio frame to generate isolated data, may perform (326) Automatic Speech Recognition (ASR) on the isolated data to generate text, may determine (328) a command included in the text and may execute (330) the command. In some examples, the device 102 may group a first number (e.g., 384) of outgoing audio frames as a first superframe and group a second number (e.g., 128) of incoming audio frames as a second superframe and remove the first superframe from the second superframe. Thus, instead of performing echo cancellation on individual incoming audio frames, the device 102 may perform echo cancellation on groups of incoming audio frames. In the example illustrated above, the first number (e.g., 384) include three times the second number (e.g., 128) due to a first sampling rate (e.g., 48 kHz) of the speaker 114 being three times a second sampling rate (e.g., 16 kHz) of the microphone 118. However, the present disclosure is not limited thereto and the number of incoming audio frames and/or outgoing audio frames included in a superframe may be equal or may vary without departing from the disclosure.

In some examples, the device 102 may stop audio playback for a period of time before resuming the audio playback. As there is no audio being played by the speaker 114, there is no need for echo cancellation. However, the microphone 118 continues to generate incoming audio frames, resulting in the receiving buffer 160 not aligning with the transmission buffer 150 when the device 102 resumes audio playback. Therefore, the device 102 may not synchronize the incoming audio data 122 with the outgoing audio data 124 upon resuming audio playback.

If the device 102 stops audio playback but continues to send outgoing audio frames to the DAC 158, the synchronization logic 104 may continue to increment the frame counter 172 and synchronize the incoming audio data 122 with the outgoing audio data 124, despite the speaker 114 not generating audio. For example, the transmission buffer 150 may store blank audio frames 410 in the transmission buffer corresponding to the period of no audio playback, the device 102 may send the blank audio frames to the DAC 158 and the frame counter 172 may continue to increment as each of the blank audio frames 410 is sent to the DAC 158. Therefore, the contents of the frame counter 172 may be accurate and the device 102 may synchronize the incoming audio data 122 with the outgoing audio data 124 using the frame counter 172. Additionally or alternatively, the device 102 may store the blank frames and increment the frame counter 172 without sending the blank frames to the DAC 158 without departing from the disclosure.

Figure 4A:
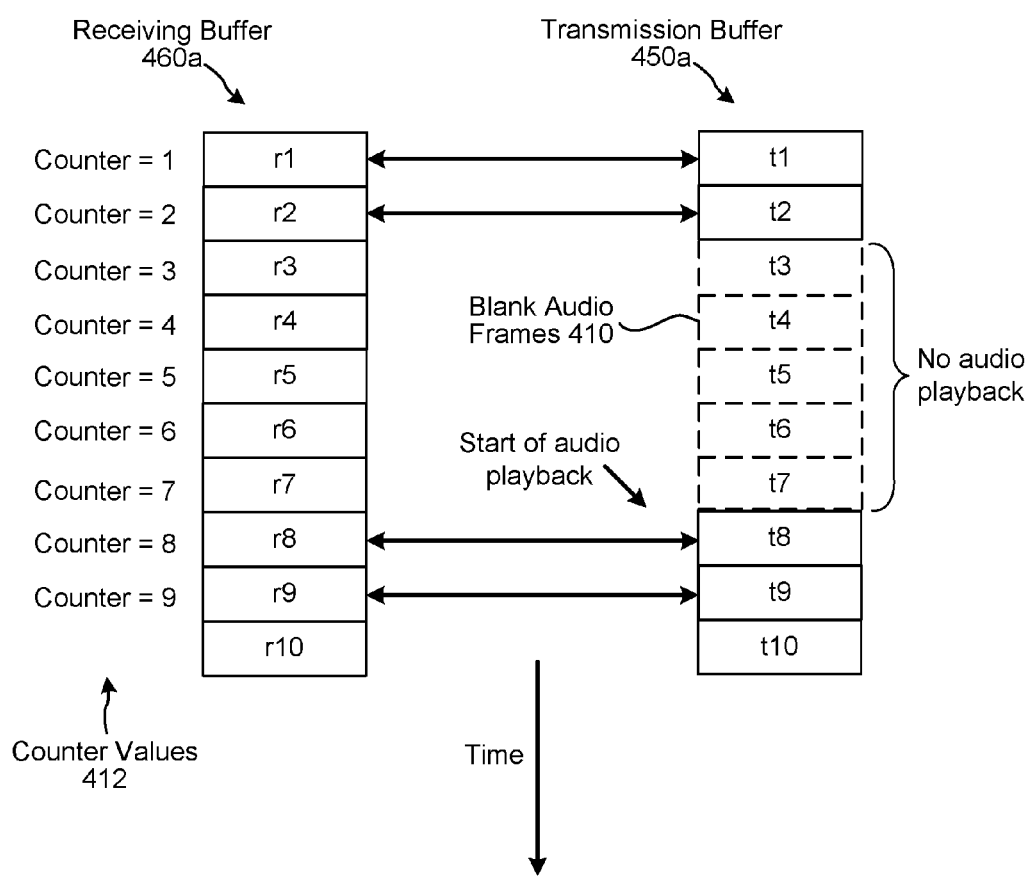
FIGS. 4A-4B illustrate examples of synchronized buffers after a period of no audio playback according to embodiments of the present disclosure.

FIG. 4A illustrates a first example of a transmission buffer and a receiving buffer when the device 102 stops audio playback. As illustrated in FIG. 4A, a transmission buffer 450a may store audio data in a first entry t1 and a second entry t2 before the device 102 stops the audio playback for a first period of time. During the first period of time (e.g., no audio playback), the device 102 may store blank audio frames 410 in entries t3-t7 of the transmission buffer 450a based on a sampling rate of the speaker 114. For example, if the sampling rate of the speaker 114 is 48 kHz, the device 102 may generate a blank audio frame every 0.02 ms so that the sampling rate of the transmission buffer 450a corresponds to the sampling rate of the speaker 114 during the first period of time. After the first period of time, audio playback is resumed and the transmission buffer 450a may store audio data in an eighth entry t8. For ease of illustration, FIG. 4A illustrates a first sampling rate of the speaker 114 being equal to a second sampling rate of the microphone 118, although the disclosure is not limited thereto.

As each entry in the transmission buffer 450a (e.g., outgoing audio frame) is sent to the DAC 158, the frame counter 172 increments, as illustrated by counter values 412. For example, the frame counter 172 continues to increment as the blank audio frames 410 are sent to the DAC 158, resulting in the counter values 412 corresponding to the entries in the transmission buffer 450a. Based on the counter values 412, the device 102 may associate the contents of the receiving buffer 460a with the contents of the transmission buffer 450a. For example, the device 102 may associate a first entry r1 in the receiving buffer 460a with a first entry t1 in the transmission buffer 450a, indicating that contents of the first entry r1 of the receiving buffer 460a (e.g., first incoming audio frame) were received by the microphone 118 substantially simultaneously to when contents of the first entry t1 of the transmission buffer 450a (e.g., first outgoing audio frame) were output by the speaker 114 as audible sound. As the frame counter 172 continues to increment due to the blank audio frames 410, when audio playback resumes, the device 102 may associate an eighth entry r8 in the receiving buffer 460a to an eighth entry t8 in the transmission buffer 450a based on the counter value of "8." Therefore, as a result of inserting the blank audio frames 410 in the transmission buffer 450a, contents of the transmission buffer 450a are still aligned with contents of the receiving buffer 460a.

However, in some examples the device 102 may stop audio playback without storing blank audio frames in the transmission buffer 150 and/or sending the blank audio frames to the DAC 158. As the microphone 118 continues to generate incoming audio frames, the receiving buffer 160 continues to receive the incoming audio frames while there is no audio playback. Therefore, the contents of the receiving buffer 160 are not aligned with the contents of the transmission buffer 150 and the device 102 may not be able to synchronize the incoming audio data 122 with the outgoing audio data 124 when the device 102 resumes audio playback.

Figure 4B:
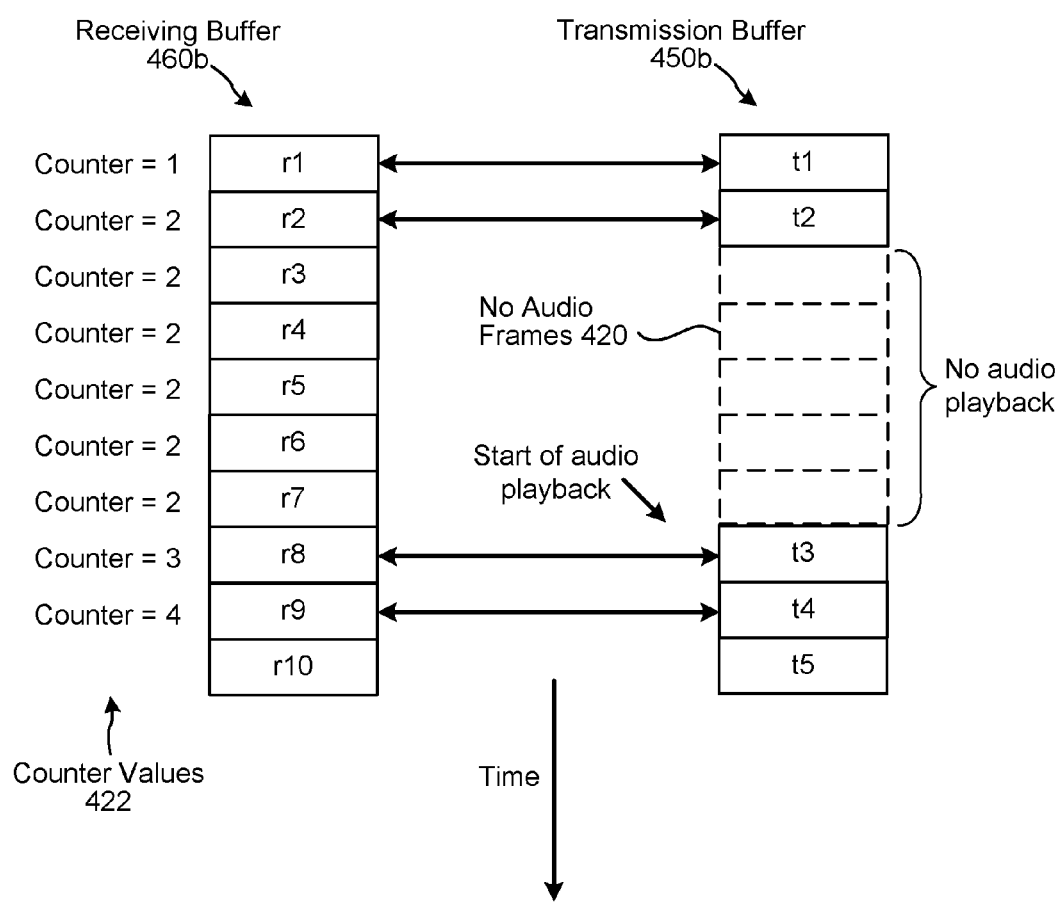

FIG. 4B illustrates a second example of a transmission buffer and a receiving buffer when the device 102 stops audio playback. As there is no audio playback sent to the speakers 114, incoming audio frames do not require echo cancellation. Therefore, instead of storing blank audio frames in the transmission buffer 150 during periods of no audio playback, the device 102 may identify first incoming audio frames corresponding to the periods of no audio playback and may output the first incoming audio frames without performing echo cancellation on the first incoming audio frames. For ease of illustration, FIG. 4B illustrates a first sampling rate of the speaker 114 being equal to a second sampling rate of the microphone 118, although the disclosure is not limited thereto.

As illustrated in FIG. 4B, the device 102 may store a first entry t1 and a second entry t2 in a transmission buffer 450b and send the first entry t1 and the second entry t2 to the DAC 158. After sending the second entry t2 to the DAC 158, the device 102 doesn't store entries in the transmission buffer 450b during a period of no audio playback, as indicated by no audio frames 420. After resuming audio playback, the device 102 may store a third entry t3 in the transmission buffer 450b and send the third entry t3 to the DAC 158.

As each entry (e.g., outgoing audio frame) is sent from the transmission buffer 450b to the DAC 158, the synchronization logic 104 may increment the frame counter 172, as illustrated by counter values 422. Using the counter values 422, the device 102 may store incoming audio frames received by the ADC 168 to the receiving buffer 460b. For example, the device 102 may store a first incoming audio frame associated with a first counter value (e.g., 1) as first entry r1 in the receiving buffer 460b and store a second incoming audio frame associated with a second counter value (e.g., 2) as second entry r2 in the receiving buffer 460b. Due to no audio frames 420 being sent to the DAC 158 during the period of no audio playback, the frame counter 172 may not increment and may instead maintain the second counter value. Thus, the device 102 may store incoming audio frames associated with the second counter value (e.g., 2) as entries r3-r7 in the receiving buffer 460b. After the third entry t3 is sent to the DAC 158, the frame counter 172 may increment to a third counter value (e.g., 3) and the device 102 may store an eighth incoming audio frame associated with the third counter value (e.g., 3) as an eighth entry r8 in the receiving buffer 460b.

To synchronize the receiving buffer 460b with the transmission buffer 450b, the device 102 may determine that there is no audio playback for a first period of time and may identify first incoming audio frames stored in the receiving buffer 460b during the first period of time. For example, the device 102 may identify that the frame counter 172 stops incrementing and that entries r2-r7 share the second counter value. In some examples, the device 102 may identify the first incoming audio frames associated with the first period of time based on a length of the first period of time and a sampling rate of the microphone 118. Thus, the device 102 may determine the first period of time between the second entry t2 and the third entry t3 in the transmission buffer 450b and may determine a number of incoming audio frames associated with the first period of time based on the sampling rate. For example, if the sampling rate of the microphone 118 is 16 kHz (e.g., incoming audio frame every 0.0625 ms) and there is no audio playback for 0.25 ms, the device 102 may determine that four incoming audio frames are associated with the first period of time. Therefore, the device 102 may output four incoming audio frames from the receiving buffer 460b without performing echo cancellation.

As illustrated in FIG. 4B, the device 102 may identify entries r3-r7 of the receiving buffer 460b as corresponding to no audio frames 420 in the transmission buffer 450. Therefore, the device 102 may perform echo cancellation on the first entry r1 and the second entry r2 of the receiving buffer 450b using the first entry t1 and the second entry t2 of the transmission buffer 450b, may output entries r3-r7 of the receiving buffer 460b without performing echo cancellation and may perform echo cancellation on entries r8-r10 of the receiving buffer 360b using entries t3-t5 of the transmission buffer 450b.

As discussed above, the device 102 may group a first number (e.g., 384) of outgoing audio frames as a first superframe and group a second number (e.g., 128) of incoming audio frames as a second superframe and remove the first superframe from the second superframe. Thus, instead of performing echo cancellation on individual incoming audio frames, the device 102 may perform echo cancellation on groups of incoming audio frames. In the example illustrated above, the first number (e.g., 384) include three times the second number (e.g., 128) due to a first sampling rate (e.g., 48 kHz) of the speaker 114 being three times a second sampling rate (e.g., 16 kHz) of the microphone 118. However, the present disclosure is not limited thereto and the number of incoming audio frames and/or outgoing audio frames included in a superframe may be equal or may vary without departing from the disclosure.

Figure 5:
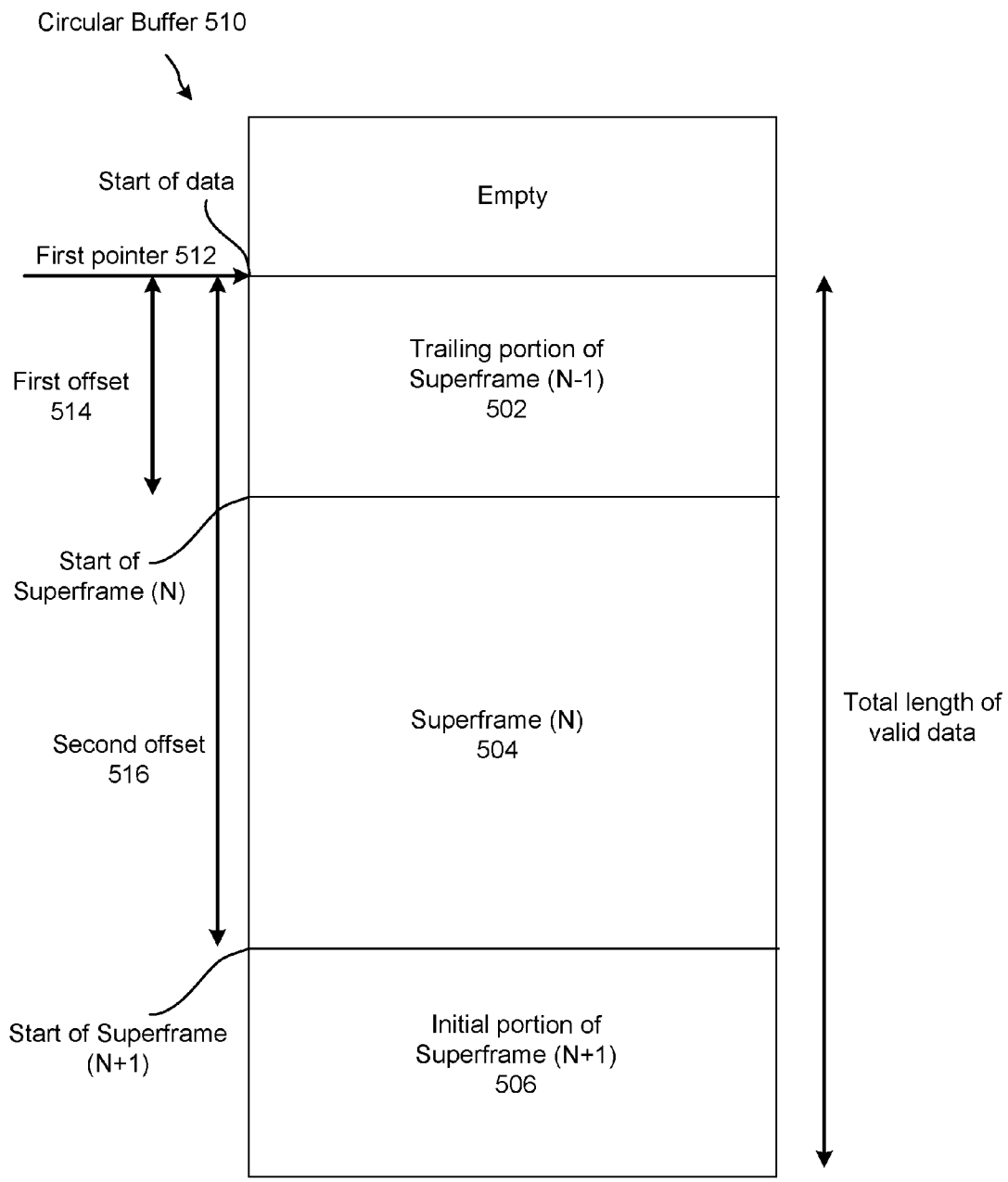
FIG. 5 illustrates an example of a circular buffer according to embodiments of the present disclosure.

FIG. 5 illustrates an example of a circular buffer used to store incoming audio frames prior to sending the incoming audio frames to the receiving buffer. While FIG. 5 illustrates the circular buffer (e.g., a buffer with a fixed size that replaces old audio frames with new audio frames), the disclosure is not limited thereto and the device 102 may use any buffer known to one of skill in the art without departing from the disclosure. As illustrated in FIG. 5, a circular buffer 510 may receive a series of incoming audio frames and may group the incoming audio frames based on an associated counter value. For example, a previous Superframe (N−1) may include a number of incoming audio frames associated with a first counter value, a current Superframe (N) may include a number of incoming audio frames associated with a second counter value and a subsequent Superframe (N+1) may include a number of incoming audio frames associated with a third counter value. In some examples, the size of the superframes may be fixed (e.g., 128 audio frames), although the disclosure is not limited thereto. As illustrated in FIG. 5, the circular buffer 510 may store a trailing portion of Superframe (N−1) 502 (e.g., a small number of incoming audio frames towards the end of the previous Superframe (N−1)), an entirety of the Superframe (N) 504 and an initial portion of Superframe (N+1) 506 (e.g., a small number of incoming audio frames at the beginning of the subsequent Superframe (N+1)).

As illustrated in FIG. 5, the circular buffer 510 has already sent a beginning portion of the previous Superframe (N−1) to the receiving buffer 160, so the receiving buffer 160 knows the counter value associated with the previous Superframe (N−1). When the circular buffer 510 initially sends the current Superframe (N) to the receiving buffer 160, the circular buffer 510 may include the associated counter value (e.g., second counter value) so that the receiving buffer 160 may synchronize the incoming audio frames with corresponding outgoing audio frames in the transmission buffer 150. Similarly, when the circular buffer 510 initially sends the subsequent Superframe (N+1) to the receiving buffer 160, the circular buffer 510 may include the associated counter value (e.g., third counter value).

The circular buffer 510 may maintain a first pointer 512 indicating a start of valid data in the circular buffer 510. To identify a start of Superframe (N), the circular buffer 510 may maintain a first offset 514 indicating an offset from the first pointer 512 to the beginning of the Superframe (N). Similarly, to identify a start of Superframe (N+1), the circular buffer 510 may maintain a second offset 516 indicating an offset from the first pointer 512 to the beginning of the Superframe (N+1). In some examples, the circular buffer 510 may maintain a third offset (not illustrated) corresponding to a total length of valid data (e.g., from the first pointer 512 to an end of the initial portion of Superframe (N+1) 506).

While FIGS. 1A-5 illustrate the device 102 incrementing a counter value based on the WCLK 157 and using the counter value to synchronize incoming audio frames in a receiving buffer 160 with outgoing audio frames in a transmission buffer 150, the disclosure is not limited thereto. Instead, the device 102 may copy the outgoing audio frames using the data line 155, the bit clock line 156 and the WCLK 157 and store the copies of the outgoing audio frames in the counter logic 170. The device 102 may align the copies of the outgoing audio frames with incoming audio frames received by the ADC 168 and may append the copies of the outgoing audio frames to the corresponding incoming audio frames. For example, a first outgoing audio frame may be sent to the DAC 158 at the same time as a first incoming audio frame is received by the ADC 168 and the first outgoing audio frame may be copied and appended to the first incoming audio frame. Thus, instead of incrementing the frame counter 172 and using the frame counter 172 to synchronize the incoming audio frames to the outgoing audio frames, the device 102 may copy an entirety of the outgoing audio frame and synchronize the incoming audio frames to the outgoing audio frames directly. In some examples, copying the entirety of the outgoing audio frame may improve synchronization and/or echo cancellation. However, copying complex audio frames may reduce an accuracy of the synchronization and/or echo cancellation due to timing issues inherent in copying the complex audio frames. For example, the device 102 may not be able to copy the entirety of the outgoing audio frame in real time, resulting in time delays.

FIG. 6 is a block diagram conceptually illustrating example components of the system 100. In operation, the system 100 may include computer-readable and computer-executable instructions that reside on the device 102, as will be discussed further below.

The system 100 may include one or more audio capture device(s), such as a microphone 118 or an array of microphones 118. The audio capture device(s) may be integrated into the device 102 or may be separate.

The system 100 may also include an audio output device for producing sound, such as speaker(s) 114. The audio output device may be integrated into the device 102 or may be separate.

The device 102 may include an address/data bus 624 for conveying data among components of the device 102. Each component within the device 102 may also be directly connected to other components in addition to (or instead of) being connected to other components across the bus 624.

The device 102 may include one or more controllers/processors 604, that may each include a central processing unit (CPU) for processing data and computer-readable instructions, and a memory 606 for storing data and instructions. The memory 606 may include volatile random access memory (RAM), non-volatile read only memory (ROM), non-volatile magnetoresistive (MRAM) and/or other types of memory. The device 102 may also include a data storage component 608, for storing data and controller/processor-executable instructions (e.g., instructions to perform the algorithms illustrated in FIGS. 1A, 1B, 6, 7 and/or 8). The data storage component 608 may include one or more non-volatile storage types such as magnetic storage, optical storage, solid-state storage, etc. The device 102 may also be connected to removable or external non-volatile memory and/or storage (such as a removable memory card, memory key drive, networked storage, etc.) through the input/output device interfaces 602.

Computer instructions for operating the device 102 and its various components may be executed by the controller(s)/processor(s) 604, using the memory 606 as temporary "working" storage at runtime. The computer instructions may be stored in a non-transitory manner in non-volatile memory 606, storage 608, or an external device. Alternatively, some or all of the executable instructions may be embedded in hardware or firmware in addition to or instead of software.

The device 102 includes input/output device interfaces 602. A variety of components may be connected through the input/output device interfaces 602, such as the speaker(s) 114, the microphones 118, and a media source such as a digital media player (not illustrated). The input/output interfaces 602 may include A/D converters for converting the output of microphone 118 into echo signals y 120, if the microphones 118 are integrated with or hardwired directly to device 102. If the microphones 118 are independent, the A/D converters will be included with the microphones, and may be clocked independent of the clocking of the device 102. Likewise, the input/output interfaces 602 may include D/A converters for converting the reference signals x 112 into an analog current to drive the speakers 114, if the speakers 114 are integrated with or hardwired to the device 102. However, if the speakers are independent, the D/A converters will be included with the speakers, and may be clocked independent of the clocking of the device 102 (e.g., conventional Bluetooth speakers).

The input/output device interfaces 602 may also include an interface for an external peripheral device connection such as universal serial bus (USB), FireWire, Thunderbolt or other connection protocol. The input/output device interfaces 602 may also include a connection to one or more networks 699 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Through the network 699, the system 100 may be distributed across a networked environment.

The device 102 further includes synchronization logic 104, an acoustic echo cancellation (AEC) 108 and counter logic 170.

Multiple devices 102 may be employed in a single system 100. In such a multi-device system, each of the devices 102 may include different components for performing different aspects of the AEC process. The multiple devices may include overlapping components. The components of device 102 as illustrated in FIG. 6 is exemplary, and may be a stand-alone device or may be included, in whole or in part, as a component of a larger device or system. For example, in certain system configurations, one device may transmit and receive the audio data, another device may perform AEC, and yet another device my use the audio outputs 128 for operations such as speech recognition.

The concepts disclosed herein may be applied within a number of different devices and computer systems, including, for example, general-purpose computing systems, multimedia set-top boxes, televisions, stereos, radios, server-client computing systems, telephone computing systems, laptop computers, cellular phones, personal digital assistants (PDAs), tablet computers, wearable computing devices (watches, glasses, etc.), other mobile devices, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of digital signal processing and echo cancellation should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. Some or all of the Acoustic Echo Cancellation (AEC) 108 may be implemented by a digital signal processor (DSP).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for synchronizing microphone inputs with speaker outputs and removing an echo from an audio signal to isolate received speech, the method comprising:
    sending, by the device to a first speaker using a first sampling rate, a first outgoing audio frame;
    operating, by the device, a first counter to store a first value, the first counter configured to store a natural number for the first outgoing audio frame and increment the natural number with each subsequent outgoing audio frame that is sent to the first speaker;
    sending, by the device to the first speaker using the first sampling rate, a second outgoing audio frame;
    incrementing the first counter to a second value;
    sending, by the device to the first speaker using the first sampling rate, a third outgoing audio frame comprising first audio data;
    incrementing the first counter to a third value;
    receiving, by the device from a first microphone of the device, a first incoming audio frame at a second sampling rate lower than the first sampling rate, the first incoming audio frame comprising second audio data, the second audio data including speech input and a first representation of audible sound output by the first speaker;
    determining, by the device, the third value output by the first counter;
    storing, by the device, the third value in the first incoming audio frame;
    associating the first incoming audio frame with the third outgoing audio frame;
    subtracting, by the device, the first audio data from the second audio data to generate the speech input;
    performing, by a server, speech recognition processing on the speech input to determine a command; and
    executing, by the device, the command.

2. The computer-implemented method of claim 1, further comprising:
    detecting a first transition in word clock data sent to the first speaker, the first transition corresponding to the word clock data changing from a low digital signal to a high digital signal;
    determining, based on the first transition, that a fourth outgoing audio frame is sent to a digital-to-analog converter included in the first speaker;
    incrementing the first counter to a fourth value;
    receiving, from an analog-to-digital converter included in the first microphone, a second incoming audio frame;
    storing the fourth value in the second incoming audio frame; and
    associating the second incoming audio frame with the fourth outgoing audio frame.

3. The computer-implemented method of claim 1, further comprising, after sending the first outgoing audio frame to the first speaker:
    determining, at a first time, that audio playback is stopped;
    receiving, at a second time after the first time, by the device from the first microphone, a second incoming audio frame;
    determining, at a third time after the second time, that audio playback is resumed;
    determining a first period of time between the first time and the third time, wherein outgoing audio frames were not sent to the first speaker during the first period of time;
    determining that the second incoming audio frame was received during the first period of time; and
    performing, by the server, the speech recognition processing on the second incoming audio frame to determine a second command.

4. A computer-implemented method, comprising:
    sending, to a first speaker using a first sampling rate, first outgoing audio data;
    associating a first counter value with the first outgoing audio data;

sending, to the first speaker using the first sampling rate, second outgoing audio data;
incrementing the first counter value to a second counter value;
receiving, from a first microphone using a second sampling rate lower than the first sampling rate, first incoming audio data including speech input and a first representation of audible sound output by the first speaker that corresponds to the first outgoing audio data;
associating the second counter value with the first incoming audio data; and
associating, based on the second counter value, the first incoming audio data with the second outgoing audio data.

5. The computer-implemented method of claim 4, further comprising:
subtracting the first outgoing audio data from the first incoming audio data to generate first isolated audio data including the speech input;
performing speech recognition processing on the first isolated audio data to determine a command; and
executing the command.

6. The computer-implemented method of claim 4, wherein sending the first outgoing audio data further comprises:
sending, via a first audio channel, the first outgoing audio data;
incrementing the first counter value to a second counter value;
sending, via a second audio channel, second outgoing audio data; and
incrementing the second counter value to a third counter value.

7. The computer-implemented method of claim 4, further comprising:
receiving an input command to begin audio playback;
storing a value of zero as a second counter value;
initializing a first buffer;
initializing a second buffer;
storing the first outgoing audio data as a first entry in the first buffer;
storing the first incoming audio data as a first entry in the second buffer; and
associating the incoming audio data with the first outgoing audio data.

8. The computer-implemented method of claim 4, further comprising:
storing, as a first entry in a first buffer, the first outgoing audio data;
determining that the first outgoing audio data is sent to a digital-to-analog converter included in the first speaker;
incrementing a first counter to the first counter value;
receiving, from an analog-to-digital converter included in the first microphone, the first incoming audio data;
storing, as a first entry in a second buffer, the first incoming audio data; and
associating the first incoming audio data with the first outgoing audio data.

9. The computer-implemented method of claim 4, further comprising:
storing, as a first entry in a circular buffer, the first incoming audio data;
determining a first address associated with a beginning of data in the circular buffer;
determining a first offset indicating a beginning of a first plurality of incoming audio frames in the circular buffer;
determining a second offset indicating a beginning of a second plurality of incoming audio frames in the circular buffer; and
sending, using the first address and the first offset, the first plurality of incoming audio frames to a second buffer.

10. The computer-implemented method of claim 4, further comprising:
determining, at a first time, that audio playback is stopped;
receiving, at a second time after the first time, second incoming audio data;
determining, at a third time after the second time, that audio playback is resumed;
determining a first period of time between the first time and the third time, wherein outgoing audio data was not sent to the first speaker during the first period of time;
determining that the second incoming audio data was received during the first period of time; and
sending, without associating the second incoming audio data with outgoing audio data or performing echo cancellation, the second incoming audio data.

11. A device, comprising:
at least one processor;
a memory device including instructions operable to be executed by the at least one processor to configure the device to:
store first outgoing audio data as a first entry in a first buffer;
detect a first transition in word clock data sent, to a first speaker, the first transition corresponding to the word clock data changing from a low digital signal to a high digital signal;
determine, based on the first transition, that the first outgoing audio data is sent to the first speaker;
increment a first counter value to a second counter value;
receive, from a first microphone, first incoming audio data including speech input and a first representation of audible sound output by the first speaker that corresponds to the first outgoing audio data;
associate the second counter value with the first incoming audio data;
store the first incoming audio data as a first entry in a second buffer; and
associate, based on the second counter value, the first incoming audio data with the first outgoing audio data.

12. The device of claim 11, wherein the instructions further configure the device to:
subtract the first outgoing audio data from the first incoming audio data to generate first isolated audio data including the speech input;
perform speech recognition processing on the first isolated audio data to determine a command; and
execute the command.

13. The device of claim 11, wherein the instructions further configure the device to:
send, via a first audio channel, the first outgoing audio data;
incrementing the first counter value to a second counter value;
send, via a second audio channel, second outgoing audio data; and incrementing the second counter value to a third counter value.

14. The device of claim 11, wherein the instructions further configure the device to:
receive an input command to begin audio playback;
storing a value of zero as a second counter value;
initialize a first buffer;
initialize a second buffer;
store the first outgoing audio data as a first entry in the first buffer;
store the first incoming audio data as a first entry in the second buffer; and
associating the incoming audio data with the first outgoing audio data.

15. The device of claim 11, wherein the instructions further configure the device to:
store, as a first entry in a first buffer, the first outgoing audio data;
determine that the first outgoing audio data is sent to a digital-to-analog converter included in the first speaker;
increment a first counter to the first counter value;
receive, from an analog-to-digital converter included in the first microphone, the first incoming audio data;
store, as a first entry in a second buffer, the first incoming audio data; and
associate, the first incoming audio data with the first outgoing audio data.

16. The device of claim 11, wherein the instructions further configure the device to:
send, to the first speaker using a first sampling rate, second outgoing audio data;
increment the first counter value to a second counter value;
send, to the first speaker using the first sampling rate, third outgoing audio data;
increment the second counter value to a third counter value;
receive, from the first microphone using a second sampling rate lower than the first sampling rate, second incoming audio data;
associate the third counter value with the second incoming audio data; and
associate, using the third counter value, the second incoming audio data with the third outgoing audio data.

17. The device of claim 11, wherein the instructions further configure the device to:
store, as a first entry in a circular buffer, the first incoming audio data;
determine a first address associated with a beginning of data in the circular buffer;
determine a first offset indicating a beginning of a first plurality of incoming audio frames in the circular buffer;
determine a second offset indicating a beginning of a second plurality of incoming audio frames in the circular buffer; and
sending, using the first address and the first offset, the first plurality of incoming audio frames to a second buffer.

18. The device of claim 11, wherein the instructions further configure the device to:
determine, at a first time, that audio playback is stopped;
receive, at a second time after the first time, second incoming audio data;
determine, at a third time after the second time, that audio playback is resumed;
determine a first period of time between the first time and the third time, wherein outgoing audio data was not sent to the first speaker during the first period of time;
determine that the second incoming audio data was received during the first period of time; and
send, without associating the second incoming audio data with outgoing audio data or performing echo cancellation, the second incoming audio data.

* * * * *